United States Patent [19]
Kammel

[11] Patent Number: 5,520,465
[45] Date of Patent: May 28, 1996

[54] PLASTIC BEARING FOR STABILIZERS IN MOTOR VEHICLES

[75] Inventor: Helmut Kammel, Damme, Germany

[73] Assignee: Lemförder Metallwaren AG, Lemförde, Germany

[21] Appl. No.: 431,255

[22] Filed: Apr. 6, 1995

[30] Foreign Application Priority Data

Apr. 20, 1994 [DE] Germany .......................... 44 13 666.8

[51] Int. Cl.$^6$ .................................................. F16C 27/06
[52] U.S. Cl. .......................................... 384/220; 384/436
[58] Field of Search .................................. 384/215, 217, 384/220, 221, 222, 295, 428, 434, 435, 436, 125, 276, 297–300; 267/154, 276, 279, 281; 280/695, 671, 673, 716, 717

[56] References Cited

U.S. PATENT DOCUMENTS

| | | | |
|---|---|---|---|
| 3,194,615 | 7/1965 | Weasler | 384/220 |
| 3,820,860 | 6/1974 | Stone | 384/428 |
| 5,013,166 | 5/1991 | Domer | 384/220 |
| 5,072,821 | 12/1991 | Kruse et al. | 384/273 X |
| 5,352,044 | 10/1994 | Jördens et al. | 384/222 X |

FOREIGN PATENT DOCUMENTS 4204252  2/1992  Germany .

Primary Examiner—Thomas R. Hannon
Attorney, Agent, or Firm—McGlew and Tuttle

[57] ABSTRACT

A plastic bearing for stabilizers in motor vehicles, which includes two half shells, which are connected to one another in one piece on a longitudinal side by a web, and whose longitudinal edges touch each other in the assembled state. The two half shells have, on the side of their web connection, one of two guide elements, which guide the half shells into the predetermined closed position during assembly. As a result, the two half shells can be vulcanized in a mold in a position in which they are swung open by 180°.

7 Claims, 1 Drawing Sheet

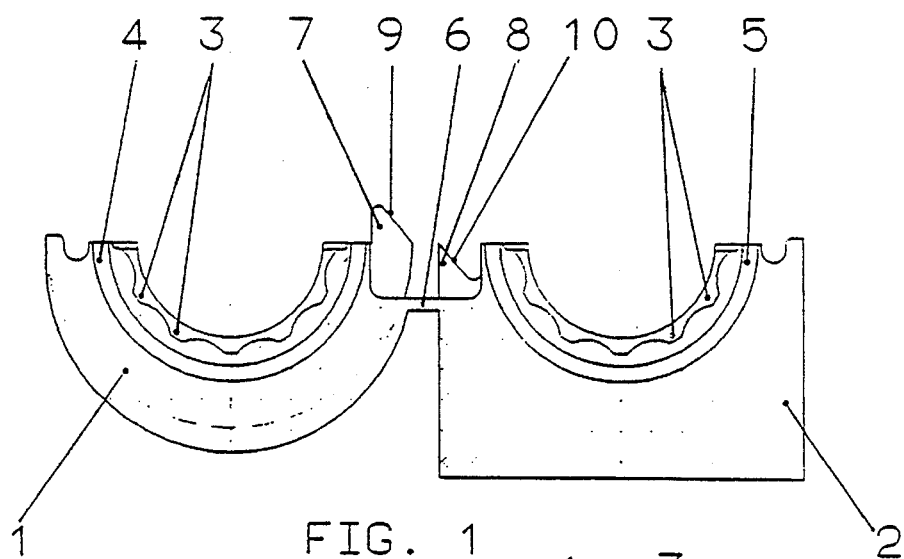
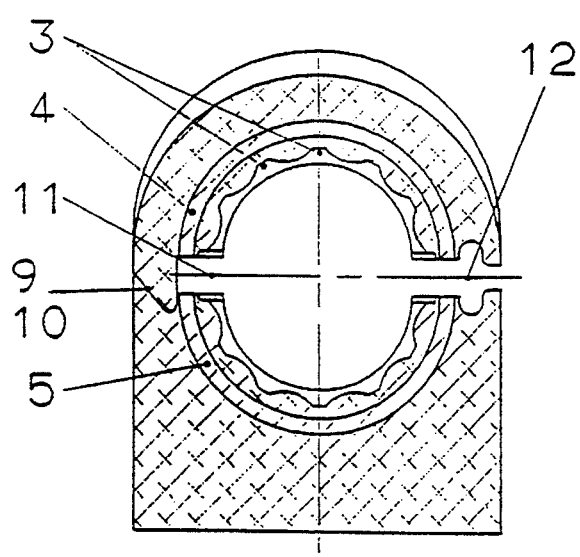
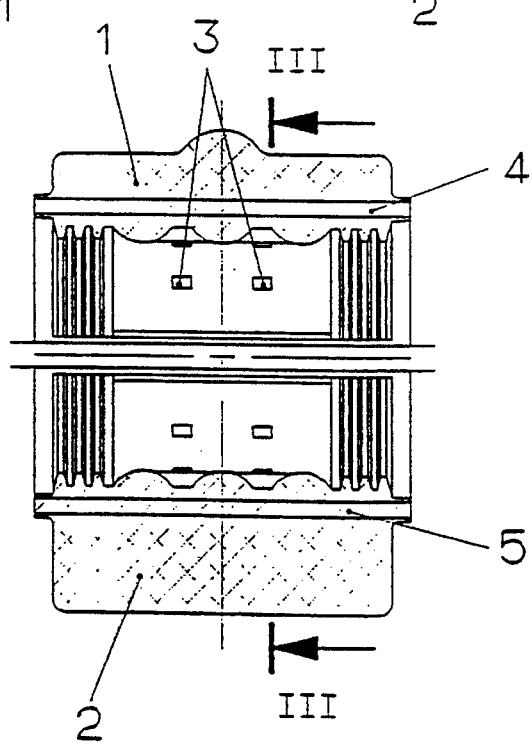
FIG. 1
FIG. 3
FIG. 2

PLASTIC BEARING FOR STABILIZERS IN MOTOR VEHICLES

FIELD OF THE INVENTION

The present invention pertains to a plastic bearing for stabilizers in motor vehicles including two half shells which are connected to one another in one piece by webs on a longitudinal side and can be swung open and whose longitudinal edges mutually touch each other in the assembled state.

BACKGROUND OF THE INVENTION

Such a plastic bearing made of an elastically deformable material, which is divided in an axial plane in a one-part design that can be swung open for assembly, and in which the two half shells are connected by a web at a longitudinal edge, has been known from German Offenlegungsschrift No. DE-OS 42 04 252. In the pre-assembled state, there is a distance between the longitudinal edges of the two half shells at right angles to the plane of division, so that the half shells are pressed together only at the time of the assembly of the housing, and thus they surround the stabilizer in a centered, tubular manner, with their longitudinal edges in mutual contact with one another.

Such a plastic bearing is vulcanized in a mold in the pre-assembled position of the two half shells in order to achieve the predetermined and centered, tubular seating of the two half shells on the stabilizer at the time of assembly. A relatively comprehensive and complicated mold is required for this.

SUMMARY AND OBJECT OF THE INVENTION

The object of the present invention is therefore to provide a design of such a plastic bearing, which makes possible an easier manufacture in a simplified mold, without compromising the reliability of accurate fit of the pre-assembled bearing on the stabilizer.

According to the invention, a plastic bearing for stabilizers in motor vehicles is provided comprising two half shells. The half shells are connected to one another in one piece by webs on a longitudinal side that can be swung open. The longitudinal edges mutually touch each other in an assembled state. The two half shells have on the side of their web connection one of two cooperating guide members.

The guide members are preferably provided as oblique surfaces, one on each of the half shells. The oblique surfaces are provided on the complimentary projections of the two half shells and the projections mutually hinder each other during the folding together of the two half shells and can then be brought into an installed position, set by the stress of the material, only by elastic deformation of the webs. The oblique surfaces located opposite each other on both sides are provided on each of the guide elements.

This design makes it possible to manufacture the plastic bearing in a one-part design in a position mutually swung open by 180°, and it guarantees a concentric, tubular seating of the plastic bearing on the stabilizer after assembly. Consequently, the plastic bearing is manufactured in a swung-open position, in which the plane of division of the two half shells is approximately in a common auxiliary plane. Compared with prior-art plastic bearings, such a plastic bearing can be vulcanized in a substantially simplified mold. The mold release process after vulcanization and the coating of the mold are simplified. The guide elements mutually come into contact with each other on the two half shells and ensure an accurately fitting, centered, tubular seating of the plastic bearing on the stabilizer during the final approaching movement of the two half shells toward each other. Oblique surfaces, which automatically bring about the accurately fitting, tubular seating during the folding together of the half shells, are preferably provided on the guide elements. In a preferred embodiment according to the present invention, the oblique surfaces are provided on complementary projections of both half shells, and these projections mutually hinder each other during the folding together of the two half shells and can be introduced into the installed position, which is set by the stress of the material, only by elastic deformation of the webs. Assembly is facilitated as a result, and it is ensured that the plastic bearing will securely reach the predetermined final position during assembly and it will then remain in that position. In addition, incorrectly assembled bearings can be easily recognized visually.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 1 is a side view of a plastic bearing represented in the swung-open position;

FIG. 2 is a longitudinal view of a plastic bearing in an axial plane before installation in a housing surrounding the plastic bearing; and FIG. 3 is a cross sectional view along line III—III in FIG. 2.

DETAILED DESCRIPTION OF THE PREFERRED EMBODIMENT

The plastic bearing having the features according to the present invention is comprised of two half shells 1 and 2, which are vulcanized in one part or in one piece from an elastomeric material in a suitable mold in the swung-open position corresponding to FIG. 1. The sliding surface on the inside of the two half shells has pockets 3 for accommodating a lubricant. Shell-shaped reinforcing inserts 4 and 5 made of sheet metal, harder plastic or the like are provided within the material of both half shells 1 and 2. The two half shells 1 and 2 are connected to one another at a longitudinal edge by one web 6 or, if desired, by a plurality of webs 6. To bring the two half shells 1 and 2 together to an accurate fit into an intermediate position according to FIGS. 2 and 3 during folding together, guide elements 7 and 8 in the form of projections, which guide the half shells into the correct intermediate assembly position during folding together, are provided on the two adjacent longitudinal edges of the half shells 1 and 2. To achieve this, oblique surfaces 9 and 10 are provided on the projections, and these oblique surfaces come into mutual contact with each other during the folding together of the half shells 1 and 2 and guide the half shells into the correct intermediate assembly position, which can be recognized especially from FIG. 3, over the last section of the swinging movement. The two half shells are then pressed together by the housing until the longitudinal edges of the two half shells, which were previously positioned opposite each other, and especially the reinforcing inserts mutually touch each other and surround the stabilizer in a tubular, concentric manner. To fix the intermediate assembly position shown in FIGS. 2 and 3, the oblique surfaces are provided, in a special embodiment according to the present invention, on complementary projections of the two half shells, which mutually hinder each other during the swinging of the two half shells toward each other and can be brought into the intermediate installed position, which is set by the stress of the material, only by elastic deformation of the web 6. The projection 7 can be lifted over the projection 8 only with a stretched web 6, so that the stress of the material of the web 6 securely holds the two half shells in the intermediate assembly position according to FIGS. 2 and 3. The visual checking for correct assembly position is facilitated by this at the same time. The pretensioning force, which is to be overcome during the pre-assembly of the plastic bearing and which holds the two half shells together after the folding together into the position shown in FIG. 2, can be changed by changing the cross section of the web 6. Thus, the pretensioning force can be adapted to different conditions and be correspondingly increased or decreased. It is possible to provide one web 6 or a plurality of webs 6. In another variant, mutually opposite oblique surfaces 9 and 10 are provided on both sides on each of the guide elements 7 and 8 in order to thus improve the security of the snapping-in movement reached during the preassembly. In deviation from the graphic representations, only one of the two slots 11 or 12 between the mutually opposite edges of the two shell halves may be opened in the pre-assembled position, and the other slot 11 or 12 may be closed, as a result of which the pretensioning force in the elastomeric material can be influenced at the time of the installation in the housing.

While a specific embodiment of the invention has been shown and described in detail to illustrate the application of the; principles of the invention, it will be understood that the invention may be embodied otherwise without departing from such principles.

What is claimed is:

1. Plastic bearing for stabilizers in motor vehicles, comprising:

a first half shell and a second half shell;

a web connecting said first half shell and said second half shell on a longitudinal side allowing the half shells to be swung open, and allowing longitudinal edges of said first and second half shells to mutually touch each other in an assembled state, said two half shells having on a side of said web connection two guide members which guide said half shells into a predetermined closed position during assembly.

2. Plastic bearing according to claim 1, wherein said guide elements of both said half shells include oblique surfaces.

3. Plastic bearing according to claim 2, wherein said oblique surfaces located opposite each other on both sides are provided on each of said guide elements.

4. Plastic bearing according to claim 2, wherein said oblique surfaces are provided on complimentary projections forming said guide members of said two half shells, said projections mutually hindering each other during the folding together of said two half shells and being brought into an installed position by elastic deformation of said web.

5. Plastic bearing according to claim 4, wherein said oblique surfaces located opposite each other on both sides are provided on each of said guide elements.

6. A plastic bearing in accordance with claim 4, wherein:

a stress in a material of said web biases said first and second half shells in said predetermined closed position.

7. Plastic bearing according to claim 1, wherein oblique surfaces located opposite each other on both sides are provided on each of said guide elements.

* * * * *